(12) United States Patent
Le Gall et al.

(10) Patent No.: US 7,027,907 B2
(45) Date of Patent: Apr. 11, 2006

(54) SEQUENCE SCHEDULING CONTROL FOR A FUEL INJECTED ENGINE

(75) Inventors: Jean-Yves Rene Le Gall, Brest (FR); Luke Newman Andersen, Greenwood (AU); Wayne Andrew Hawken, Bibra Lake (AU); Craig Bowman, North Perth (AU); Troy Bradley Epskamp, Kiara (AU); Peter Truong, Kiara (AU); Phillip Leo O'Neill, Stirling (AU); Koon Chul Yang, Woodvale (AU)

(73) Assignee: Orbital Engine Company (Australia) Pty Limited, Balcatta (AU)

( * ) Notice: Subject to any disclaimer, the term of this patent is extended or adjusted under 35 U.S.C. 154(b) by 113 days.

(21) Appl. No.: 10/276,729

(22) PCT Filed: May 18, 2001

(86) PCT No.: PCT/AU01/00575

§ 371 (c)(1),
(2), (4) Date: Nov. 18, 2002

(87) PCT Pub. No.: WO01/90558

PCT Pub. Date: Nov. 29, 2001

(65) Prior Publication Data
US 2003/0144789 A1    Jul. 31, 2003

(30) Foreign Application Priority Data
May 19, 2000  (AU) ..................................... PQ7649
May 19, 2000  (AU) ..................................... PQ7650

(51) Int. Cl.
*B60T 7/12*     (2006.01)
(52) U.S. Cl. ....................... 701/105; 701/102; 701/110; 701/111; 701/115; 73/117.3; 73/118.2; 123/406.18; 123/406.19

(58) Field of Classification Search ................ 701/105, 701/115, 110, 102, 111, 29, 35; 123/406.18, 123/406.19, 406.23, 406.24, 406.58, 406.59; 73/117.3, 118.2
See application file for complete search history.

(56) References Cited

U.S. PATENT DOCUMENTS

| 4,926,319 A | * | 5/1990 | Wilkie et al. ................ 713/502 |
| 4,934,329 A |   | 6/1990 | Lear |
| 4,960,092 A |   | 10/1990 | Sasaki et al. ................ 123/414 |
| 5,076,234 A |   | 12/1991 | Fukui |

(Continued)

FOREIGN PATENT DOCUMENTS

DE         39 23 479 A1    1/1991

(Continued)

*Primary Examiner*—Tony M. Argenbright
*Assistant Examiner*—Johnny H. Hoang
(74) *Attorney, Agent, or Firm*—Rothwell, Figg, Ernst & Manbeck

(57) ABSTRACT

An electronic control unit for an internal combustion engine having a fuel injection system and an ignition system including: timing determination means (2) for determining timing sequences for injection events of the fuel injection system and ignition events of the ignition system and to provide update timing sequence data (10) to a schedule sequencing means (3) adapted to control at least one driver circuit (4) wherein the at least one driver circuit (4) is adapted to provide drive pulses (11) to the fuel injection system and ignition system; wherein the schedule sequencing means (3) is adapted to select between update sequence data to at least one of an injection of ignition event, such that the update timing sequence data is selected when there is no current injection occurring.

31 Claims, 14 Drawing Sheets

U.S. PATENT DOCUMENTS

| | | | |
|---|---|---|---|
| 5,245,972 A | 9/1993 | Denz et al. | 123/478 |
| 5,445,014 A | 8/1995 | Fiorenze, II et al. | 73/117.3 |
| 5,558,062 A * | 9/1996 | De Minco et al. | 123/361 |
| 5,829,410 A | 11/1998 | Hirose | 123/421 |
| 6,032,653 A * | 3/2000 | Anamoto | 123/491 |
| 6,115,666 A * | 9/2000 | Ng | 701/115 |
| 6,208,131 B1 * | 3/2001 | Cebis et al. | 324/165 |
| 6,257,200 B1 * | 7/2001 | Worth | 123/305 |

FOREIGN PATENT DOCUMENTS

| | | |
|---|---|---|
| DE | 40 34 524 A1 | 5/1991 |
| JP | 09-114590 | 6/1997 |
| WO | WO 99/28621 A1 | 6/1999 |

* cited by examiner

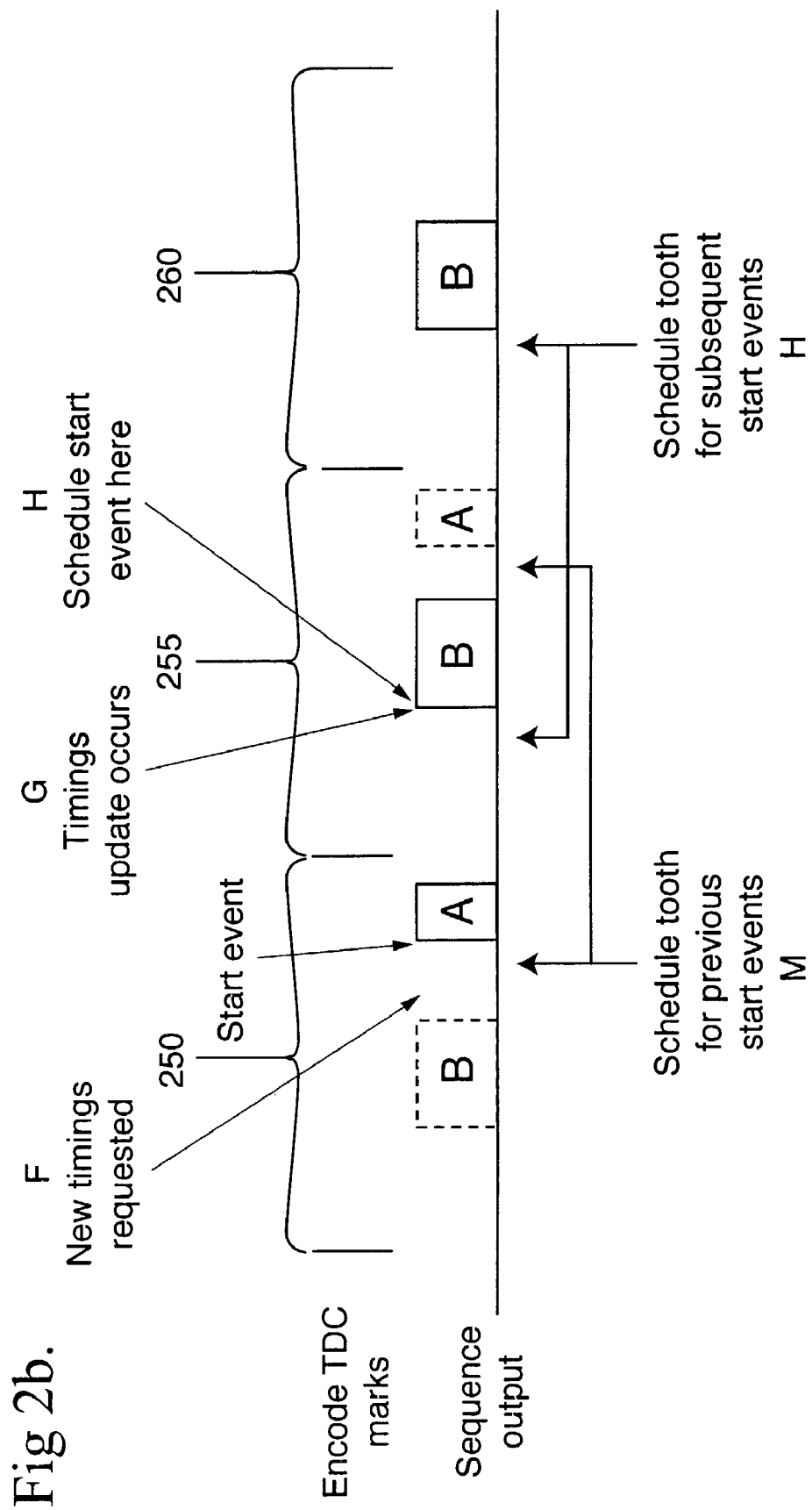

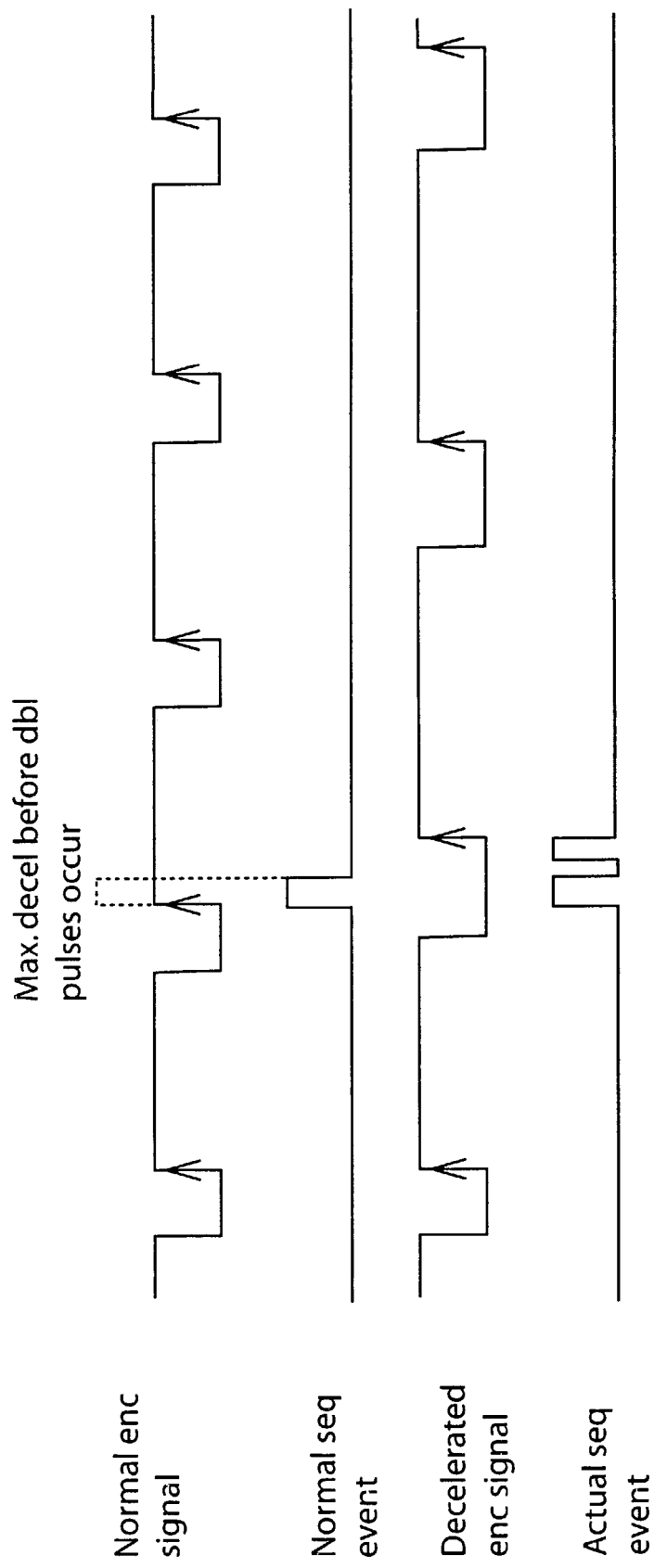

Fig 7.

Case 1.
Compression TDC

720 DEGREES UPDATE
Write Ignition
Calculate new angles and set
InjSchTimingsReady Foreground
write into TPU 540 DEGREE UPDATE
Calculate new angles and
set InjSchTimingsReady Foreground
write into TPU 360 DEGREE EVENT UPDATE
Calculate new angles and
set InjSchTimingsReady Decide to write
the new
timings at end
of air interrupt
and TDC Fuel and Air 180 DEGREE UPDATE
Calculate new angles
and set
InjSchTimingsReady Foreground Write
into TPU Interupt write
Fuel and Air into TPU Can not write the
new timings
because a writing
is in progress

Fig 11.

Case 5

Compression TDC

720 DEGREES UPDATE
Update from 180 degrees
is held due to temporary
event, 1100

Write into the TPU
the second event

1120  Temporary event
which gets over-
writen with the
second event at the
720 degree update.

540 DEGREE UPDATE

First event

FA1

360 DEGREE EVENT UPDATE

D

1105

1110

1115

180 DEGREE UPDATE

INTERUPT
Write temporary
event after
TDC to prevent
starting another
long event
before TDC Second event
Can' write this yet
because it would
cause two events
in one cycle.
Write a temporary
event after TDC
and hold s/w
updates.

SEQUENCE SCHEDULING CONTROL FOR A FUEL INJECTED ENGINE

The present invention is directed to the control of the sequence scheduling of certain events which govern the operation of an internal combustion engine, and in particular the injection and ignition events for an internal combustion engine having a fuel injection system. The present invention will in the main be described with respect to four stroke engines having a dual fluid direct injection system. It is however to be appreciated that the present invention is also applicable to other engine types such as single fluid direct injection and port injected four stroke engines, single and dual fluid direct injection and port injection two stroke engines applications.

Modern internal combustion engines generally incorporate an electronic or engine control unit (ECU) for controlling the combustion and overall operation of the engine. In the case of an engine incorporating an electronic fuel injection system, the ECU typically controls the timing of the fuel injection and ignition events within each engine cylinder. The timing of these events are generally controlled as a function of various operational parameters such as driver demand, engine speed, the air flow into the engine and so on. The ECU processes signals from various sensors which measure these operational parameters to subsequently determine the required timing sequence of the injection and ignition events for the prevailing engine cycle or the next engine cycle. The timing sequence typically being the relative crank angles at which injector solenoids are actuated and at which the ignition system is activated.

The Applicant has developed various types of dual fluid injection systems where metered quantities of fuel are entrained in compressed air for delivery to the engine cylinder(s). Such dual fluid injection systems are for example described in the Applicants' U.S. Pat. No. 4,934,329 and PCT Patent Application No. WO 99/28621, details of which are incorporated herein by reference. As such systems typically include both electronically controlled compressed gas delivery injectors and fuel injectors for metering fuel into the delivery injectors the ECU must be able to control the relative timing, typically with regard to engine crank angle, at which the solenoids of the injectors are actuated and at which the ignition system is activated.

Under certain operational conditions, it has been observed that the ECU can cause the delivery injectors and/or the fuel metering injectors to actuate twice in a cycle or to not actuate at all during a cycle. Similarly the ignition system has been observed to fire twice or to not fire at all.

With this in mind, according to one aspect of the present invention, there is provided an electronic control unit for an internal combustion engine having a fuel injection system and an ignition system including:

timing determination means for determining timing sequences for injection events of the fuel injection system and ignition events of the ignition system and to provide update timing sequence data to a schedule sequencing means on an intermittent basis; said schedule sequencing means adapted to control at least one driver circuit wherein the at least one driver circuit is adapted to provide drive pulses to the fuel injection system and ignition system;

wherein the schedule sequencing means is adapted to select between update timing sequence data received from the timing determination means and prevailing timing sequence data for at least one of an injection or ignition event, such that update timing sequence data is selected when there is no current injection event occurring.

The timing determination means may also provide an updated timing sequence for the ignition event at the same time as for the injection event when no current ignition event is occurring.

Preferably, the timing determination means may provide an updated timing sequence for the injection event after the provision of the updated schedule timing for the initial event timing when there is no current ignition event occurring.

Preferably, the timing determination means may provide an updated timing sequence for the ignition event after the provision of the updated timing sequence for the initial event timing when there is no current ignition event occurring.

The event chain relationship between said injection and ignition events can therefore be maintained by the present invention, even when the injection event and ignition event timings are updated separately.

In the case of an engine having a dual fluid injection system, the event chain refers to the fuel metering event, air delivery event and an ignition event that is to occur on a particular cylinder and which was determined for a particular set of engine operating conditions. The present invention also allows the relationship between these events to be maintained, while allowing injection and ignition timings to be altered, and while also protecting against undesirable missing events and double events that often result when timings are advanced or retarded by large amounts.

According to another aspect of the present invention, there is provided a method for controlling the timing sequence of injection and ignition events in an internal combustion engine having a fuel injection system and an ignition system, the method including:

determining an updated timing sequence of injection and ignition events as a function of the operating condition of the engine;

scheduling at least the timing sequence of the injection event for the fuel injection system based on the updated timing sequence for the injection event when there is no current injection event occurring; and providing drive pulses to the injection system based on the updated timing sequence.

The timing sequence for the ignition event may also be updated at the same time as for the injection event when no current ignition event is occurring.

Alternatively, the timing sequence for the ignition event may be updated after the provision of the updated schedule timing for the injection timing when there is no current ignition event occurring.

In the case of an engine having a dual fluid injection system, the event chain refers to-the fuel metering event, air delivery event and an ignition event that is to occur on a particular cylinder and which was determined for a particular set of engine operating conditions. The present invention also allows the relationship between these events to be maintained, while allowing injection and ignition timings to be altered, and while also protecting against undesirable missing events and double events that often result when timings are advanced or retarded by large amounts.

Preferably the fuel injection system for the engine is able to effect multiple fuel delivery events during a single cylinder cycle. In the case of a dual fluid injection system, one or both of the fuel metering event or the air delivery event may be effect more than once during the same cylinder cycle. Such a dual injection strategy is discussed in the Applicants' PCT Patent Application No. WO99/28621, the contents of which are incorporated herein by reference.

Conveniently, the method according to the present invention is effected when the fuel injection system switches from operating in a single injection mode to a dual injection mode or vice versa. It has been found by the Applicant that the transition between dual injection and single injection may often result in the generation of an unwanted extra event or a missing event and so the present invention bonds itself to remedying this situation.

Preferably, the method is effected when there is a rapid transition from late scheduled events to early scheduled events. That is, the method is particularly applicable when the timings for either of the fuel injection and/or ignition events revert from retarded to advanced. Similar contents apply in regard to any transition in things from advanced to retarded.

Conveniently, the timing sequences for the injection and ignition events are scheduled at the same time. That is, no updated sequences for the injection and ignition events are scheduled unless they are updated together.

According to a further aspect of the present invention there is provided according to one aspect of the present invention, there is provided an electronic control unit (ECU) for an internal combustion engine having at least one operational element controlled by said ECU wherein said ECU includes a scheduler for outputting timing sequence control signals for controlling said at least one operational element; said scheduler being adapted to update at least one prevailing timing sequence control signal in dependence on at least one operational parameter of said engine.

Preferably said at least one operational parameter of said engine being at least one of crankangle of a crankshaft of said engine; engine load; and engine speed.

Preferably an update signal for use in updating said prevailing timing sequence control signal includes an update angle; said scheduler updating said prevailing timing sequence control signal in dependence on said crankangle and said update angle.

Preferably said scheduler is adapted to compare said update angle with said crankangle and to update said prevailing timing sequence control signal when said update angle equals said crankangle and when said operational element is not activated by said prevailing timing sequence control signal.

Preferably said comparison of said update signal occurs upon generation of said signal or upon said scheduler receiving said update signal.

Preferably said at least one operational element comprises a fuel injector system and an ignition system. Preferably said electronic control unit further includes a timing determination means for determining the timing sequence of an injection event of a fuel injection system and an ignition event of an ignition system; and a driver circuit which receives inputs from the scheduler for providing drive pulses to the fuel injection system and ignition system;

wherein the scheduler selects between a prevailing timing sequence signal or an update timing sequence signal to control the driver circuit depending on said at least one operational parameter of the engine.

According to a yet another aspect of the present invention there is provided a method for controlling the update of a prevailing timing sequence for actuation of an operational element of an internal combustion engine;

the method including at least the step of updating said prevailing timing sequence from an update timing sequence in dependence on at least one operational parameter of said engine.

Preferably said at least one operational parameter is at least one of: engine crank angle; engine speed; and engine load.

Preferably said update timing sequence signal includes an update crank angle value and said step of updating said prevailing timing sequence signal is dependent on said engine crank angle being equal to said update angle.

Preferably said operational element is not actuated by said prevailing timing sequence signal when said engine crank angle equals said update angle.

Preferably said engine further includes operational elements of a fuel injection system and an ignition system, the method further including determining an updated timing sequence of injection and ignition events as a function of the operating condition of the engine;

scheduling the timing sequence of the injection and ignition events for the fuel injection system and the ignition systems respectively based on the updated timing sequence or a current timing sequence prior to being updated depending on the engine operating condition; and providing drive pulses to the injection system and ignition system based on the timing sequence.

When the update timing sequence for the start sequence event is advanced relative to the prevailing timing sequence, then the update timing sequence is used if a start event has as yet not occurred. The driver circuit is controlled using the update sequence event. This will eliminate or at least minimise missing pulse problems.

However, when the update timing sequence for the start sequence event is retarded relative to the current timing sequence, then the prevailing timing sequence is used if a start event has already occurred. The driver circuit is controlled using the prevailing timing sequence. In this case this will eliminate or at least minimise double pulse problems.

Accordingly, the control parameters which effect engine operation are only updated when required.

According to a further aspect of the present invention there is provided an electronic control unit for an internal combustion engine having at least one operational element controlled by a timing sequence signal; said ECU adapted to generate update timing sequence signals for updating a prevailing timing sequence signal wherein said ECU determines whether said update timing sequence signal is asynchronous with the prevailing timing sequence signal and selects at least one procedure depending on said update timing sequence signal being asynchronous.

Preferably said at least one update procedure is to update said prevailing timing sequence signal with said update timing sequence signal in at least a two stage process.

Preferably said timing sequence signal includes a fuel injector control signal for controlling a fuel injection system and an ignition signal for controlling an ignition system and said at least a two stage process includes updating a prevailing fuel injection signal separately from said ignition system signal.

According to a yet another aspect of the present invention there is provided a method of controlling an internal combustion engine having at least one operational element controlled by at least one timing sequence signal determined by an electronic control unit (ECU); the method including the steps of determining an update timing sequence signal for a prevailing timing sequence signal; detecting whether said update timing sequence signal is asynchronous with said prevailing timing sequence signal and selecting at least one procedure depending on said update timing sequence signal being asynchronous.

Preferably said at least one update procedure is to update said prevailing timing sequence signal with said update timing sequence signal in at least a two stage process.

Preferably said timing sequence signal includes a fuel injector control signal for controlling a fuel injection system and an ignition signal for controlling an ignition system and said at least a two stage process includes updating a prevailing fuel injection signal separately from said ignition system signal.

It will be convenient to further describe the invention with respect to the accompanying drawings which illustrate a preferred embodiment of the present invention. Other embodiments of the invention are possible, and consequently, the particularity of the accompanying drawings is not to be understood as superseding the generality of the preceding description of the invention.

In the drawings:

FIG. 1b is a schematic view of an ECU utilised in FIG. 1a;

FIG. 2b is a timing diagram used by an embodiment of the ECU of FIG. 1b for updating timing sequences from retarded timings to advanced timings.

FIG. 3 is a timing diagram showing an alternate

FIG. 7 is crankangle diagram showing an alternate mode of scheduling updates of timing events;

FIG. 11 is crankangle diagram showing an update from a dual injection mode to a single injection mode.

The present embodiments detail operation of an ECU capable of scheduling actuation of multiple engine components at predetermined points in an engine cycle. Each actuation is referred to as an event or a group of events. In particular such an ECU can typically schedule multiple events that form a chain of successive, and in some cases co-dependent events (referred to as an "event chain"). These event chains may extend over a period exceeding one engine cycle. Certain embodiments can schedule execution of an event chain exceeding one engine cycle without adversely impacting on an event chain that the ECU is currently executing (a "prevailing event chain") or an event chain that is to be executed subsequent to the prevailing event chain.

Figure 1A:
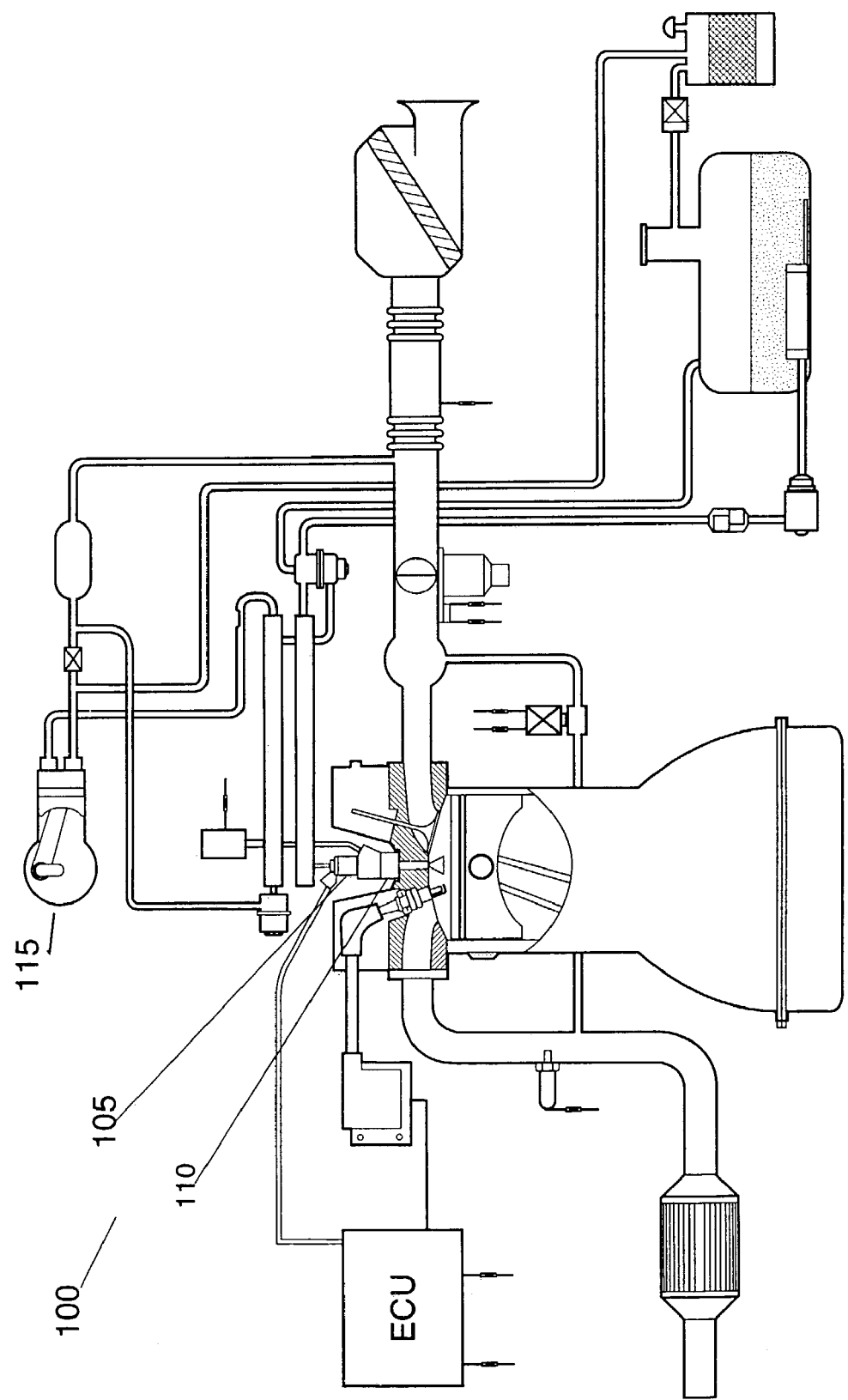
FIG. 1a is a schematic representation of an internal combustion engine and various engine components operated by an Electronic Control Unit (ECU)

FIG. 1 is a schematic representation of a four stroke engine 100 with a direct injection fuel system, referred to as a dual fluid or air assisted fuel system. Present embodiments are particularly well suited to application in a dual fluid fuel injection system, though they are not limited to such and are applicable to other direct injection engines and port injected engines.

The dual fluid direct injection fuel system of engine 100 uses a fuel injector 105 to meter fuel to a delivery injector 110 that in turn communicates the metered fuel to a combustion chamber of the engine 100. The delivery injector 110 is typically in constant fluid communication with a second fluid, such as compressed air supplied by a compressor 115. The compressed air operates as a propellant to deliver the metered fuel into the combustion chamber. Typically the fuel is entrained by the compressed air during this process.

The arrangement of the delivery injectors 110 and the fuel metering injector 105 allows fuel to be metered in a separate event to when it is delivered into a combustion chamber. This gives rise to an event chain having three events, fuel metering (actuation of a fuel injector), fuel delivery (actuation of a delivery injector) and ignition (activation of a spark plug or similar device). As fuel metering can be separate to fuel delivery the event chain can extent for more than one engine cycle. For example, fuel metering for an engine cycle, designated as engine cycle "n", can commence in engine cycle "n−1". Typically fuel metering in engine cycle "n−1" for engine cycle "n" occurs after actuation of delivery injector in engine cycle "n". The relative points in an engine cycle where the fuel metering, fuel delivery and ignition events occur can be referred to as a timing sequence of an event chain.

The ECU operates in real time as a fuel metering, fuel delivery and ignition event chain is typically required to occur once per cylinder per engine cycle for effective operation of the engine. The events in the event chain are typically required to occur within 4° of crank angle or less of when they are scheduled to occur. Hence it is undesirable for the events to occur late, early or to be missed all together. Accordingly the ECU operates with foreground processes that ensure that requisite event chains happen every engine cycle. The ECU also has background processes that are typically computational processes for implementing control strategies and for calculating new timing sequences to implement these control strategies. Background processes are typically less time critical than foreground processes and so can be interrupted by foreground processes.

The engine 100 has a direct injection fuel system. Such direct injection fuel systems allow the engine to operate with a stratified charge of fuel in the combustion chamber. Stratified charges of fuel are typically used at low load operation and consist of a localised ignitable charge of fuel within a region of the combustion chamber. Typically this region is adjacent the spark plug. Where fuel is ejected from the delivery injector 110 so as to form a spray or cloud of fuel in the combustion chamber and where this cloud or spray passes over the spark plug and so is ignited directly by the spark plug, then the fuel system may be referred to as a spray guided fuel system. Timing of ignition, fuel delivery and fuel metering events for spray guided systems is more critical than in a standard manifold port injected (homogenous charges) engine as the relative timings between fuel delivery and spark ignition need to be sufficiently accurate that an ignitable portion of the fuel spray exists adjacent the spark plug at the time of sparking. Similarly, timing needs to be accurate for other forms of stratified charge engines, such as wall guided stratified charge engines.

ECUs according to present embodiments regularly determine new timing sequences of event chains, such as the fuel metering, delivery and ignition event chain referred to above. Many ECUs can generate several sets of timing sequences over an engine cycle. It is typical however for only one event chain per engine cycle to be executed for any one particular sub system of an engine. Updating a prevailing timing sequence with a new timing sequences is referred to as timing sequence scheduling or simply sequence scheduling. Hence new timing sequences need to be scheduled for execution relative to any prevailing event chain currently being executed by the ECU to ensure that only one event chain is executed in an engine cycle. Scheduling new timing sequences should also be done relative to any other timing sequences that may have also been recently generated. Where several sets of timing sequences are generated in an engine cycle it is typical for some of these sets to be discarded as a consequence of scheduling processes. Typically it is desired that the most recent set of timing sequence information be implemented and this results in earlier timing sequences being discarded when the latest timing sequence is scheduled to update any prevailing timing sequence.

Certain embodiments, typically for low cost applications, aim to implement sequence scheduling so as to avoid the occurrence of double actuation of components and missed actuations of components in an engine cycle, as can happen when sequence scheduling is not performed in a controlled manner. More sophisticated applications such as for four stroke passenger vehicles, implement sequence scheduling with the additional aim of maintaining event chain integrity when new timing sequences are scheduled. This is preventing a prevailing event chain from being corrupted with a portion of a new timing sequence during execution and typically requires greater processor capability. Both low cost application and sophisticated applications typically aim to execute the latest possible one of the timing sequences generated over the prevailing engine cycle.

Figure 1B:
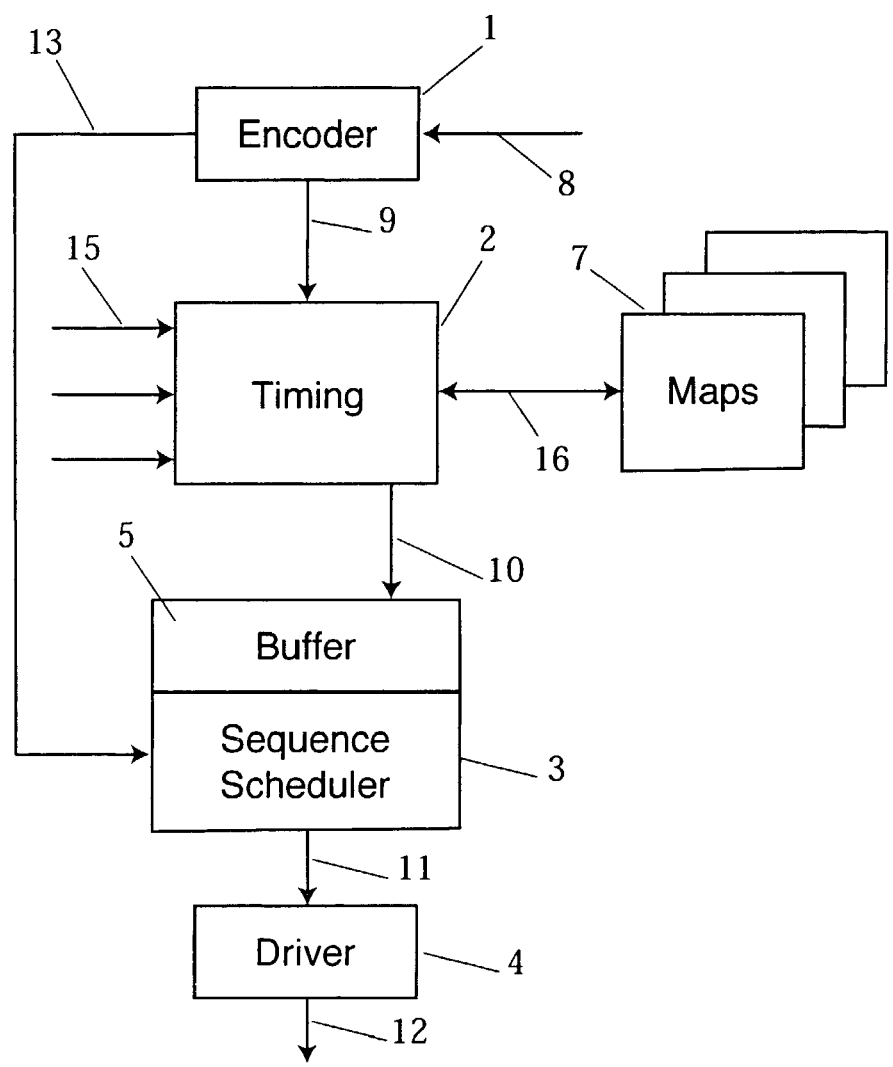

Referring now to FIG. 1b which shows a selection of elements within an (ECU) according to a present embodiment. These elements of the ECU are used in controlling timing sequences of fuel injection and ignition events of an internal combustion engine. In this ECU an encoder element 1 receives raw encoder data 8 from a toothed encoder disc located on a crankshaft of the engine 100. The encoder element 1 processes this information and provides a crank signal 9, which details the engine's speed and current crankangle. The encoder element forwards the crank signal 9 to a timing element 2 and to a sequence scheduler 3. The timing element 2 also receives engine condition signals 15 which provide details of prevailing engine operating conditions such as driver demand, air flow to the engine and so on. This engine condition information 15 and crank signal 9 are read against look-up maps 7 which detail timing sequence information for engine based events such as fuel injection and ignition events. The timing sequence of the injection and ignition events is typically the relative crank angles at which the solenoids of the fuel metering injector 105 and the fuel delivery injector 110 are actuated and at which the ignition system is activated to cause a spark.

Timing sequence information from the maps 7 is read into the timing element 2, where further processing may occur depending on any particular control strategy that is presently being employed by the ECU. Such control strategies are well known in the art and so won't be further elaborated herein.

Once finally determined, the timing element 2 forwards timing sequence information as timing signal 10 to a sequence scheduler 3 which schedules activation of driver circuits 4. The driver circuits receive driver control signals 11 from sequence scheduler 3. These driver control signals 11 activate the driver circuits so that engine components actuate with timings specified by timing signal 10. It is common to have a dedicated driver circuit for each solenoid and ignition circuit that is controlled by the ECU. Other components actuated, sampled or read by the ECU may also have driver circuits. Accordingly these other components may have their operation scheduled by present embodiments. Examples include manifold absolute pressure sensor, particularly when sampled synchronously with crank angle, exhaust gas emissions sensors, air flow sensors, fuel and air pressure sensors and the like, and may also include logic driven events.

The scheduler 3 also determines when to update timing sequence information that is used in actuating solenoids of the injectors and in activating the ignition system. The scheduler 3 includes a buffer 5 which receives and stores timing signal 10. The sequence scheduler 3 also receives crank signals 9 from the encoder element 1 which the scheduler 3 requires in order to schedule event chains and to determine when the driver circuit 4 should be activated by driver control signals 11. In the case of the engine fuel injection system being a dual fluid fuel injection system, the buffer 5 may comprise separate buffers for the fuel metering and fuel delivery events and the ignition event so that timings for actuation of these engine components can be updated simultaneously or separately as required.

In a typical ECU for a four stroke engine the timing element 2 may calculate the fuel metering, air delivery and ignition timing sequence data for each cylinder of the engine every 180° of crank angle. This newly calculated timing sequence data represents possible update data that may be used by the scheduler 3 to replace the prevailing timing sequence data used by the scheduler 3 in execution of the event chain of the next engine cycle.

The calculation of update timing sequence data is typically a background process of the ECU. The operation of the scheduler 3 in its' control of driver circuits 4 is typically a foreground process. Accordingly under some engine operating conditions calculation of update timing sequence data may be delayed. The occurrence of such delays is to a certain extent dependent on the power of the processor used within the ECU.

The scheduler 3 along with controlling the operation of driver circuits 4, has to determine when to update the prevailing timing sequence information that it is currently using to execute the prevailing event chain via control of the driver circuits 4. The process for updating the prevailing timing sequence information is usually performed having regard to factors such as the relative timings of the prevailing timing sequence and the various update timing sequences generated since the prevailing timing sequence was last updated, along with factors such as current engine speed and current engine crank angle.

For example, when prevailing timing sequence information is highly advanced, due say to a high load condition and the update timing sequence information is highly retarded, due to say a sudden decrease in driver demand, the manner in which update timing sequence information is utilised by the scheduler 3 in preference to the prevailing information is different to where engine timings go from retarded low load settings associated with idle conditions to high load advanced setting associated with driver demand for rapid acceleration. Accordingly scheduling of updates is typically a dynamic process that is, at least in part, dependent on the prevailing timing sequence, the update timing sequence and the crank angle at which the sequence scheduler 3 commences scheduling of new timing sequence data.

Timing sequence information for a dual fluid direct injection engine, for each cylinder, has at least five events that need to be timed relative to each other, typically by means of engine crank angle. These events are:

1) start of fuel metering (SOF) by the fuel injector 105 metering fuel into the delivery injector 110;

2) end of fuel metering (EOF) which is cessation of the metering of fuel into the delivery injector 110;

3) start of air (SOA), which is the commencement of the delivery of fuel by the delivery injector 110 into a cylinder of the engine. This event is referred to as start of air as the delivery injector is typically in constant communication with a source of compressed air. When the delivery injector opens, fuel previously metered into the injector is delivered to a cylinder entrained in the compressed air.

4) end of air (EOA) which is closure of the delivery injector 110; and 5) ignition which is activation of the spark plug associated with the cylinder into which fuel entrained in compressed air has just been delivered.

The order in which and the crank angles at which start of fuel, end of fuel, start of air, end of air, and ignition occur over an engine cycle is an example of a timing sequence of an event chain. Utilisation of an update timing sequence needs to be done with reference to the relative timings of prevailing timing sequence and update timing sequence. In updating a timing sequence the scheduler 3 needs to check whether or not the update timing sequence can be properly commenced on the current cycle before the update is utilised. The scheduler also needs to check whether or not a prevailing timing sequence has commenced before it proceeds to utilise the update timing sequence.

Situations can arise where it is not possible to update the timing sequence information at the one time. For example, where the prevailing timing sequence is a low load retarded timing sequence and the update timing sequence is a high load advanced timing sequence, it may be necessary to update timing sequence for start of fuel and end of fuel, start of air and end of air separately to ignition. Hence update of prevailing timing sequence information can be a two stage process or a three stage process etc, depending of the specifics of the prevailing timing sequence and the update timing sequence.

It should be noted that for high load advanced timing, start of fuel for the next engine cycle may commence after end of air of the current cycle but before ignition of the current cycle. In these circumstances, the fuel/air/ignition event chain can overlap two engine cycles and can also extend for more than 720 degrees of crank angle. This can occur for dual fluid injection system where the fuel is metered into a holding chamber in a delivery injector before it is delivered by the delivery injector into the relevant combustion chamber of the engine.

Accordingly, whilst the generation of update timing sequence information may occur in a manner that is relatively synchronous with engine operation (eg every 180 degrees of crank angle) a particular update timing sequences may not be synchronous in operation with the prevailing timing sequence. That is to say, update timing sequences are not typically generated having regard to prevailing timing sequences and hence any particular update timing sequence may be asynchronous relative the prevailing timing sequence. In performing an update to a prevailing timing sequence the scheduler selects whether or not to immediately update the prevailing timing sequence or to complete a part of the prevailing timing sequence before commencing the update in a staged manner or to complete the whole of the prevailing timing sequence before performing the update.

Figure 1C:
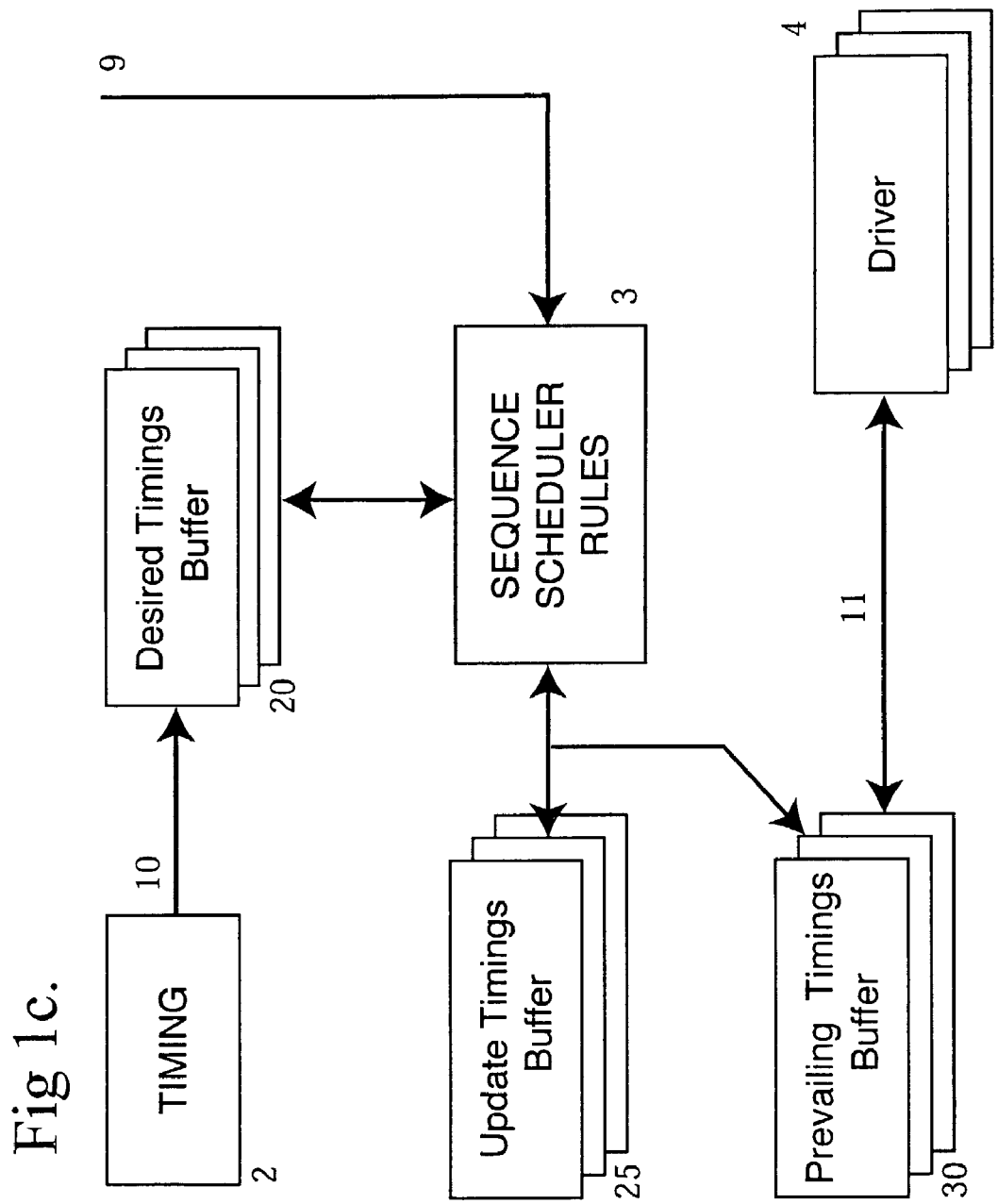
FIG. 1c is a schematic representation of a sequence scheduler of the ECU of FIG. 1b.

FIG. 1c shows an embodiment of a sequence scheduler 3 in greater detail. It consists of three buffers, though other memory elements may be used. These buffers are a desired timings buffer 20, an update timings buffer 25 and a prevailing timings buffer 30. The desired timings buffer receives new timing sequence information via timing signal 10 on a regular basis such as every 180° of crank angle for a four stroke passenger vehicle application. These new timings are known as "desired timings". The prevailing timing sequence buffer 30 contains timing sequence information for generating driver control signals 11 that cause driver circuit 4 to execute the prevailing event chain. Sequence schedule rules 35 of the sequence scheduler 3 are used to move data between the update timing buffer 25, the prevailing timing buffer 30 and the desired timing buffer 20.

Each of the buffers has three elements. Each of these elements stores one of three separate sets of data, one set of data for each of fuel injector timings, delivery injector timings and ignition timings for a dual fluid direct injection fuel system. The driver circuit 4 has three driver sub-circuits, one each for a fuel injector, delivery injector and ignition element of a cylinder of an engine. Each driver sub-circuit receives a driver control signal 11 generated by a corresponding buffer element in the prevailing timings buffer 30. This structure may be replicated for each cylinder of an engine, though only one set of the sequence scheduler rules 35 may be provided.

Figure 2A:
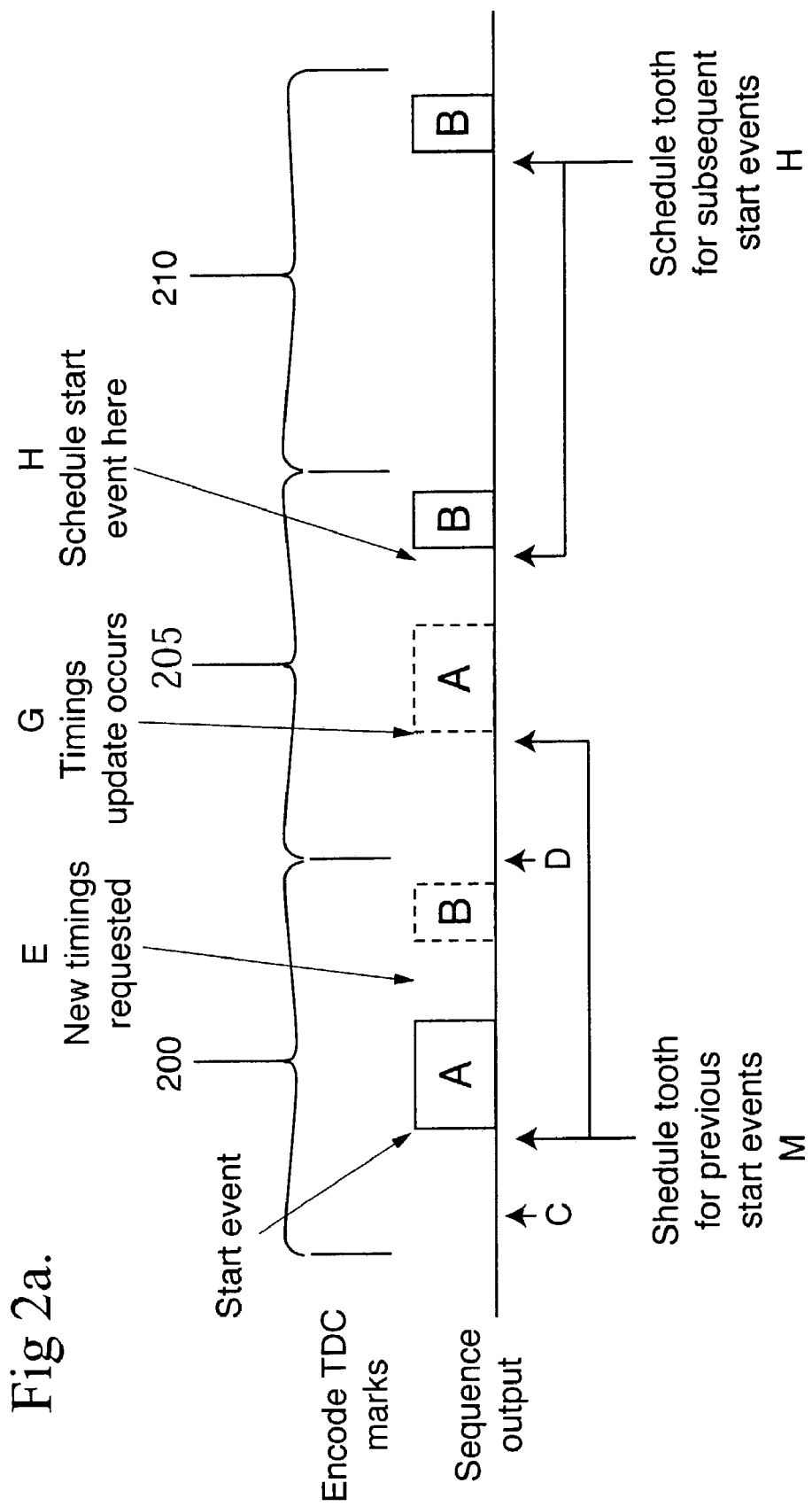
FIG. 2a is a timing diagram used by an embodiment of the ECU of FIG. 1b for updating timing sequences from advanced timings to retarded timings.

Referring now to FIG. 2a which is a timing diagram demonstrating how double actuation of a component, such as a fuel injector, can occur in one engine cycle. Such double actuation may be referred to as a double pulse as the ECU generates two pulses in driver signal 11 in the one engine cycle, each of which actuates the engine component.

The timing diagram shows three representative engine cycles, a prevailing engine cycle 200, a second engine cycle 205 and a third engine cycle 210. In the prevailing engine cycle 200, there is indicated a prevailing event A and an update event B whose timings are retarded relative to event A.

If event B was scheduled so as to update the prevailing event A before event A commenced, for example at crank angle C, then event B could safely replace prevailing event A in the prevailing timings buffer 30 without both event A and event B occurring in the same cycle. This replacement of event A with event B is known as an update of the prevailing timings buffer 30. Similarly, if event B was scheduled so as to update prevailing event A after the crank angle at which event B would commence, but before the end of the prevailing engine cycle 200, for example at crank angle D, then event B can safely update the prevailing event A as event B typically will not commence until the second engine cycle 205.

However, if event B is scheduled so as to update the prevailing event A at crank angle E (which crank angle E is after the prevailing event A will finished but before event B would commence) then both event A and event B would occur within the one prevailing engine cycle 200. Hence by implementing the update event B without reference to event A, a double pulse can occur in the one engine cycle. Double pulses can typically arise when update timing sequences are retarded relative to prevailing timing sequences.

Referring now to FIG. 2b which is a timing diagram demonstrating how actuation of a component can be missed within an engine cycle. Three engine cycles are represented, a prevailing engine cycle 250, a second engine cycle 255 and a third engine cycle 260. Two events, event A and event B, are depicted within the prevailing engine cycle 250. Event B is an update event whose timing is advanced relative to event A. However the timings for event B has been scheduled to update the prevailing event A at crank angle F, which is after event B can occur, but before event A can occur. Accordingly when event B replaces event A in the prevailing timings buffer, event A does not happen as it was over written when event B was scheduled, but event B does not happen as it was scheduled too late for it to commence in the prevailing engine cycle. According neither event A or event B occurs within the prevailing engine cycle. Missed pulses usually occur when timings move from retarded to advanced.

To avoid double pulses and missed pulses, updates of new timings data needs to take place having regard to prevailing sequence timings. For example when update timings are retarded relative to prevailing timings, as in FIG. 2a, the update timings may be scheduled to update the prevailing timings buffer at crank angle G that is the same as or immediately before crank angle M where the prevailing timings are scheduled to commence. Once updated, the prevailing timings in the second engine cycle 205 are scheduled to commence at or immediately before crank angle H. Hence updating of the prevailing timing buffer 30 with update timings from the update timings buffer 25 is scheduled to occur at a separate crank angle to which the update timings are scheduled to commence.

When the update timings are advanced relative to the prevailing timings, as in FIG. 2b, then the update timings may be scheduled to update the prevailing timings buffer at a crank angle G which is the same as or immediately before crank angle H where the new timing sequence is scheduled to commence. Accordingly, the update of the prevailing timing buffer is scheduled at the same crank angle as the crank angle at which the update timings will commence.

Hence scheduling of updates to prevailing timing sequence buffers is an dynamic process that is determined from update to update having regard to the relative timings of the update timing sequence and the prevailing timing sequence and may also have regard to the crank angle of the engine when the update timings are received and/or calculated.

Further detail on update scheduling will now be provided by way of a further example. Suppose a new timing sequence is received in the desired timings buffer 20. The sequence scheduler 35 may compare the prevailing timing sequence in the prevailing timing sequence buffer 30 with the new timings in the desired timings buffer 20. If the new timings are retarded relative to the prevailing timings, then the update of the prevailing timings should be scheduled to occur a fixed crank angle prior to the crank angle at which the prevailing timings commence. This fixed crank angle is typically one encoder tooth and may be referred to as the crank angle at which the update of the prevailing timing sequence is scheduled to occur. Once the crank angle for performing an update has been determined, this crank angle is added to the desired timings data as schedule information. The desired timing sequence and the update schedule is stored in the update timing buffer 25, with the desired timing sequence now referred to as the update timing sequence.

If on the other hand the desired timings are advanced relative to the prevailing timing, the update of the prevailing timing buffer is scheduled to occur at a fixed crank angle before commencement of the desired timings. This fixed crank angle is typically one encoder tooth before commencement of the desired timings. Again, once the crank angle at which the prevailing timings are to be updated is determined, the desired timings are stored as update timings in the update timings buffer 25 along with their schedule information for performing the update.

At the crank angle that corresponds with the scheduled crank angle for updating the prevailing timings buffer, the update timings are written from the update timings buffer 25 to the prevailing timings buffer 30. The prevailing timings buffer 30 then controls actuation of the driver 4 by generating driver control signals 11 in accordance with the new timings just stored in the prevailing timing buffer.

This update procedure for fuel metering, fuel delivery and ignition operates so that each of the events in an event chain is updated independently of the other events. This means that desired timings for fuel delivery is compared against prevailing timings for fuel deliver without regard to prevailing or desired timings for fuel metering and ignition events. Hence it is not guaranteed that the integrity of an update event chain will be preserved during this update process where individual events in an event chain are updated independently of each other. This allows a chain of events to execute with new timing for say fuel delivery and ignition but with timing for fuel metering from the previous event chain. Such an update process is particularly suited to low powered processor typically found on low cost applications such as fuel injected scooters and motorcycles.

It should be noted that start events, such as SOF, SOA and SOI generally occur in the angle domain and therefore they are normally scheduled via encoder interrupts. However, for long sequences, it is sometimes necessary to schedule a start event from a stop event interrupt because it may be too late for a subsequent encoder interrupt to schedule the sequence. Peak events, which may be an event intermediate a, start event and a stop event, typically occur in the time domain and therefore may be scheduled from start event interrupts. Typically a peak event is used to change the current draw of a driver circuit 4 from a level required to actuate a solenoid to a level required to hold the solenoid in a steady state.

Unlike start and peak events, stop events (such as EOF, EOA and EOI) can occur in either angle or time domains depending on the control mode of a sequence. For angle-controlled sequences, stop events may be scheduled from the start event, peak event or encoder interrupts. For time-controlled sequences, stop events can only be scheduled from either the start or peak event interrupts. However, in cases of long sequence duration or rapid acceleration, it may be necessary to force a stop event to occur immediately by scheduling it from an encoder interrupt in order to maintain scheduling synchronisation.

Start events are typically only scheduled from encoder interrupts if the following conditions are satisfied:

The prevailing timing sequence buffer is not active. If a prevailing timing sequence buffer is active, it then means the sequence pulse generation process is already under way and there is no need to schedule a start event;

Sequence scheduling has not been initiated yet. This condition indicates that no start event has been scheduled from either a previous encoder interrupt or the last stop event interrupt; and The current encoder tooth matches the schedule tooth of a start event.

The decision for determining whether a stop event shall be scheduled during an encoder interrupt is dependent on the following conditions:

The prevailing timing sequence buffer is active;

The prevailing timing sequence buffer output is not a very short sequence pulse (meaning less than 1 encoder tooth period and start/stop events occurring within the same encoder tooth);

The next occurrence of a sequence interrupt is not for a peak event; and

The current encoder tooth matches the schedule tooth of a stop event.

Sequence event scheduling from start event interrupts is required for scheduling peak events and stop events. For injection sequences, the ECU shall attempt to schedule the peak event first. If the peak event is not scheduled, the ECU shall then attempt to schedule the stop event. If the stop event is also not scheduled, the ECU shall then rely on subsequent encoder interrupts to schedule it. For ignition sequences, peak event scheduling is not relevant and the ECU shall attempt to schedule the stop event directly.

Sequence event scheduling from peak event interrupts is required for scheduling stop events only. The ECU typically attempts to schedule the stop event and if the stop event is not scheduled, the ECU then relies on subsequent encoder interrupts to schedule it.

Sequence event scheduling from stop event interrupts is only required for scheduling start events. In the case of a very long sequence duration or rapid engine acceleration, it is sometimes necessary to schedule the start event immediately because it may be too late to schedule it from a subsequent encoder interrupt.

Further because double pulses may be required for some specific operations (for example, during fast-start/pump-up and dual injection operations), the ECU may offer the control system the option to enable/disable the double pulse prevention strategy. If this strategy is disabled, timing sequence updates shall be scheduled to occur at the schedule tooth of the new start event, thus effectively allowing double pulses to be generated.

For duration controlled sequences (i.e. those sequences that commence at a specified crank angle and that proceed for a specified time period so as to end independently of crank angle), double pulses may occur momentarily if the engine experiences rapid deceleration as illustrated in FIG. 3. To avoid this problem, it is necessary to inhibit the sequence scheduler from scheduling the next start event during a stop event interrupt if the sequence pulse is very short, that is, less that 1 encoder tooth in length and both start/stop events occur within the same tooth. To implement this test efficiently, the following algorithm can be adopted.

Whenever a start event is scheduled, it assumes that the sequence is very short by setting a an appropriate flag (eg: ShortEvent) flag in the ECU. Subsequently, this flag shall be cleared during encoder interrupts if the start event has already occurred. So, by checking the ShortEvent flag before scheduling the next start event, the double pulse problem can be avoided.

Figure 4:
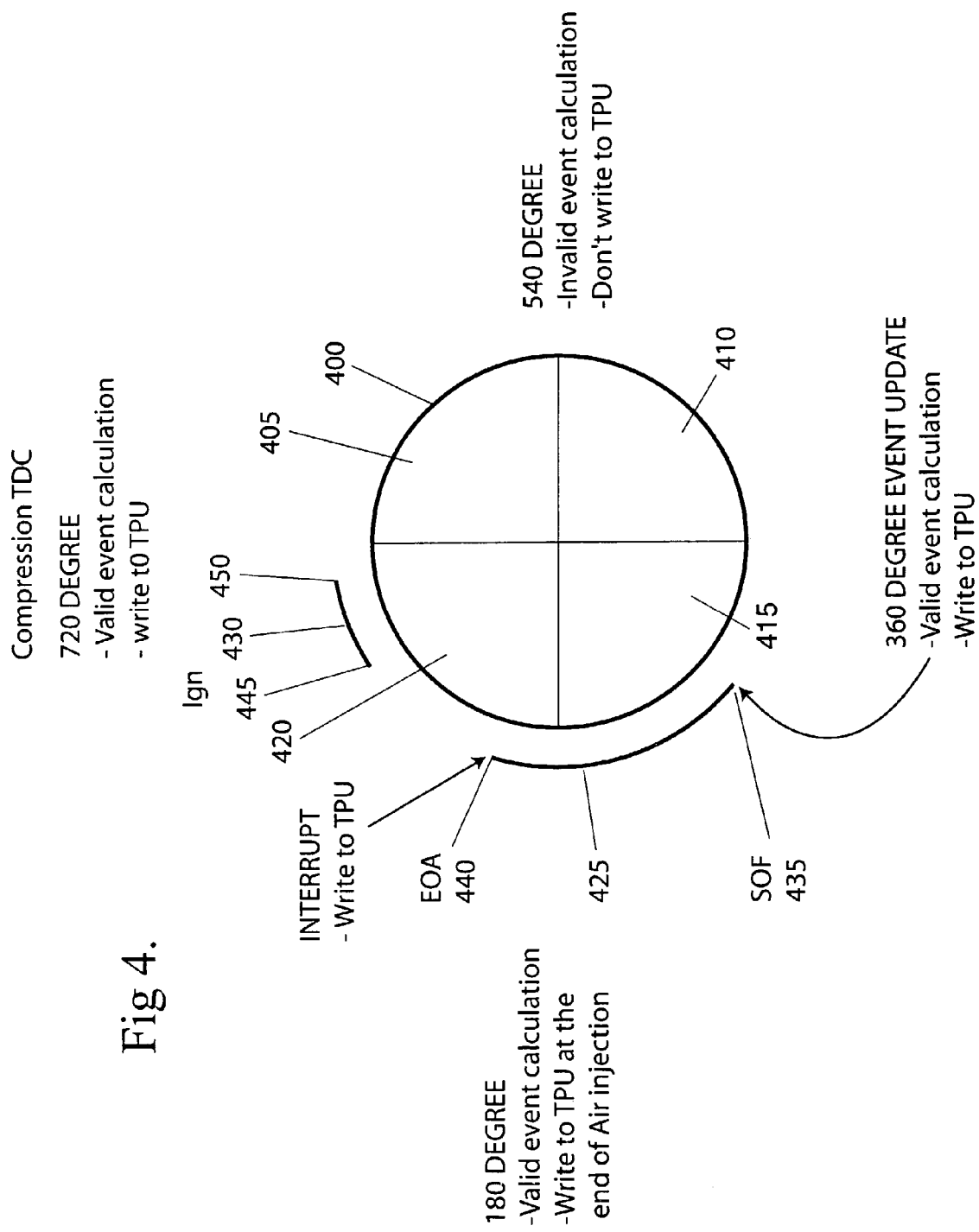
FIG. 4 is a crankangle diagram showing updating of timing sequences under steady state conditions.

Alternate embodiments maintain event chain integrity during an update of a prevailing timing sequence buffer 30. Such embodiments will now be detailed, first with reference to FIG. 4 which is known as a crank angle diagram. A crank angle diagram is a diagrammatic representation of an engine cycle. FIG. 4 represents a four stroke engine cycle. A four stoke engine cycle takes place over four piston strokes (i.e. over two revolutions of a crankshaft). These strokes are referred to as an expansion stroke, an exhaust stroke, an intake stroke and a compression stroke.

The circle 400 in the centre of FIG. 4 represents the 720° of crank angle rotation in a four stroke cycle. Each quadrant of circle 400 therefore represents 180° of crank angle rotation, such that the first quadrant 405 extends between top dead centre (TDC) firing (near where ignition occurs) to the bottom of the expansion stroke. The second quadrant 410 represents the exhaust stroke, the third quadrant 415 corresponds with an intake stroke and the fourth quadrant corresponds with a compression stroke. The quadrants are designated in "degrees before top dead centre firing" (BTDC). Hence the first quadrant, the expansion stroke, occurs between 0° BTDC and 540° BTDC. The second quadrant 410, the exhaust stroke, occurs between 540° BTDC and 360° BTDC. Hence the exhaust stroke ends at completion of the first of the two engine revolutions in the four stroke engine cycle. The third quadrant 415, the intake stroke, extends between 360° BTDC and 180° BTDC and the fourth quadrant, the compression stroke, extends between 180° BTDC and 0° BTDC.

A prevailing event chain consisting of a first arc 425 and a second arc 430 can be seen to extend across portions of the third and fourth quadrants of the crank angle diagram of FIG. 4, with the first and second arcs separated from each other. The first arc 425 represents timings for fuel metering and fuel deliver of the event chain. Accordingly the first arc 425 commences with an SOF event 435 and ends with an EOA event 340. The SOF event 435 can be seen to occur at approximately 270° BTDC and the EOA event 440 can be seen to occur at approximately 160° BTDC. Additionally EOF and SOA events take place during the first arc 425 of the event chain. Hence the first arc 425 consists of a chain of four events, namely SOF, EOF, SOA and EOA. In a dual fluid system it is typical for EOF to occur before SOA. This is referred to as the fuel air delay, it is not essential to have a fuel air delay in a dual fluid direct injection fuel system.

The second arc 430 represents ignition, and may be specified as commencing at a start of ignition (SOI) angle 445 (approximately 50° BTDC) and ending at an end of ignition (EOI) angle 450 (approximately 20° BTDC). Accordingly the prevailing event chain depicted in FIG. 4 is the sequence of six events SOF, EOF, SOA, EOA, SOI, EOI extending between approximately 270° BTDC and 20° BTDC.

During operation of the engine, the timer 2 may generate new timing sequences every 180° of crank angle. These new timing sequences are stored by timing signal 10 in the desired timings buffer 20 and the sequence scheduler rules 35 are, used to determine how the timing sequence data stored in the desired timings buffer 20 is processed.

Under steady state operating conditions, as depicted in FIG. 4, timing signal 10 is generated and written to desired timings buffer 20 at 0° BTDC, 540° BTDC, 360° BTDC and 180° BTDC. At 0° BTDC the event scheduler rules 35 interrogate the desired timings and determines that SOF is scheduled to commence later in the engine cycle than 0° BTDC and so can be validly executed during the present engine cycle. It also interrogates the prevailing timings and determines that the fuel and air elements of the prevailing buffer are not active, which indicates that the prevailing timings are set to commence later in the cycle. Accordingly, the desired timings buffer is written to both the update buffer and the prevailing buffer. This process of writing from the desired timings buffer to the update timings buffer and the prevailing timings buffer can repeat at both 540° BTDC and 360° BTDC (note: as the engine is operating at steady state the timings for 0° BTDC, 540° BTDC, 360° BTDC and 180° BTDC are essentially the same and so only one set of timings are represented in FIG. 4).

At 180° BTDC, the same timings are again generated and the scheduler rules 35 determine that the fuel and air elements of the prevailing timings buffer are active and so the desired timings buffer is only written to the update timings buffer. Once the first section 425 of the prevailing event chain has finished (i.e. once EOA has occurred) an interrupt occurs and the update timings for fuel metering and fuel delivery are written from their respective elements of the update timing buffer 25 to their respective elements of the prevailing timings buffer 30. Once the prevailing ignition event has occurred (i.e. once EOI has occurred) another interrupt copies update ignition timings from the ignition timing element of the update timing buffer to the ignition timing element of the prevailing timing buffer.

This process of interrupts at various points throughout an event chain that causes update timings in the update timing buffer to be written to the prevailing timing buffer is referred to as a guaranteed update process. It ensures that at least one new set of timings are written to the prevailing timing buffer every cycle. The guaranteed update process is most effective where there is a system requirement that no single event in a chain can exceed one engine cycle (ie 720° of crank angle for a four stroke engine). For example SOF and EOF should not be spaced by more than 720° of crank angle. This provides a gap in the fuel metering event which allows an interrupt to force an update of the prevailing timing buffer element for fuel metering. Preferably SOF and EOF are spaced by less than 720° so that there is sufficient time to call an interrupt at the end of the event and to write from the update timings buffer to the prevailing timings buffer. This restriction that a single event can not exceed 720° does not prevent event chains from over lapping two engine cycles or from exceeding one engine cycle.

Figure 5:
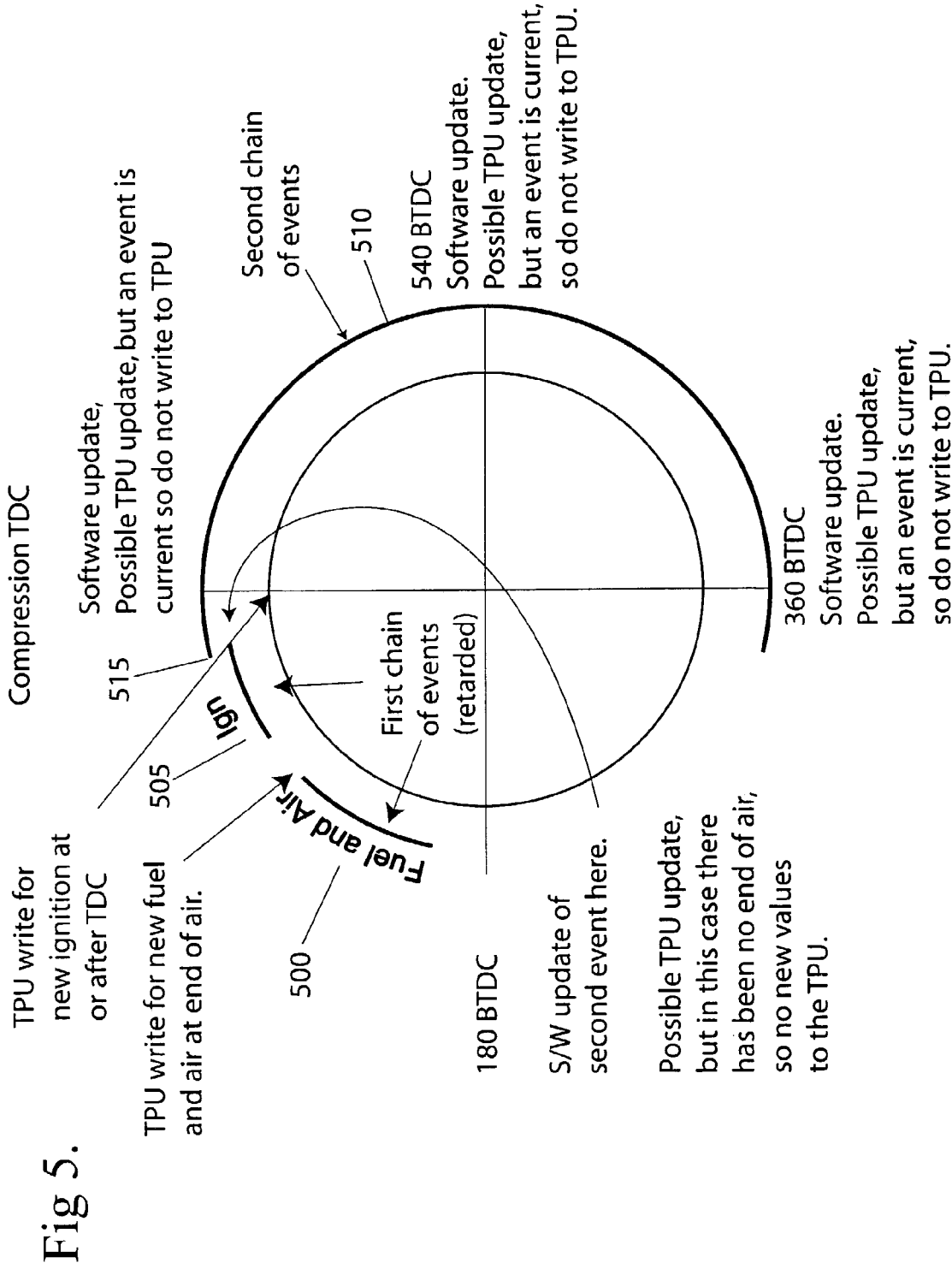
FIG. 5 is a crankangle diagram an update of timing sequences when timing sequences change from retarded to advanced.

FIG. 5 depicts a process of sequence scheduling by scheduler 3 where the prevailing timing sequences change from retarded 500 & 505 to advanced 510 when updated by the update timings buffer. This diagram illustrates how it is not always possible to write new timing sequence information to the prevailing timing buffer 30 every 180 deg CA because the prevailing timing buffer 30 is active due to execution of a prevailing event. At 0° BTDC a desired timing sequence 510 is received in desired timings buffer 20. The timing sequence overlaps two engine cycles with the SOF event 515 commencing in the previous cycle to where ignition occurs (note; ignition in the update timings is similar to ignition in the prevailing timings and so has not been represented). It is not possible to move the desired timing sequence to the prevailing timing sequence buffer without missing fuel metering and fuel delivery events as the desired timing sequence is required to commence before 0° BTDC for the prevailing engine cycle, which is a point in time that has already occurred (ie a point in time during the previous engine cycle). Accordingly, the prevailing timing sequence in the prevailing timing buffer 30 that was written during the previous "guaranteed update" period is retained in the prevailing timings buffer 30 and the desired timings buffer 20 is written to the update timings buffer 25. Similarly at 540 degrees BTDC and 360 degrees BTDC. At 180 degrees BTDC it is possible to write the desired timing sequence to the prevailing timings buffer 30, however the prevailing injection and ignition events 500 for the current cycle would be missed as they would be replaced with the update timings 510 which would commence with SOF 515 in the current engine cycle and extend into the next engine cycle. Hence no combustion event would occur.

Accordingly, the update timing buffer elements for start of fuel (SOF), end of fuel (EOF), start of air (SOA) and end of air (EOA) are written to the corresponding elements in the prevailing timing buffer 30 at the end of the fuel and air event 500 of the prevailing timing sequence and the update of the ignition timing occurs at TDC. Hence in going from retarded fuel and air event 500 & 505 timings to advanced timings 510 the guaranteed update period is utilised, resulting in a two stage update process occurring. This ensures that event chain integrity is preserved for the prevailing event chain and the update event chain so that valid event chains are continuously executed during engine operation.

The scheduler 3 should not therefore utilise update or desired timings from either of an update or desired timings buffer 25, 20 when a prevailing event chain has commenced execution or when the update or desired timings are scheduled to commence before the update of the prevailing buffer 30 is finished. Because update timings can be comparatively long to calculate, their calculation preferably happen as a background process, accordingly the update of prevailing buffer 30 that occurs at the end of the air injection event is preferably done in an interrupt and it preferably happens as a foreground process. In order to comply with this and to have the update of the prevailing event buffer 30 as close as possible to the end of the latest calculation of sequence timings, one possible solution is to force a foreground at the end of each update. In this foreground process, the software will decide how to update the prevailing timing buffer 30 and the update timing buffer 25. If it is possible the desired or update timings will be written during this foreground process otherwise the data will be updated during a guaranteed update process or at the next TDC event or both.

Figure 6:
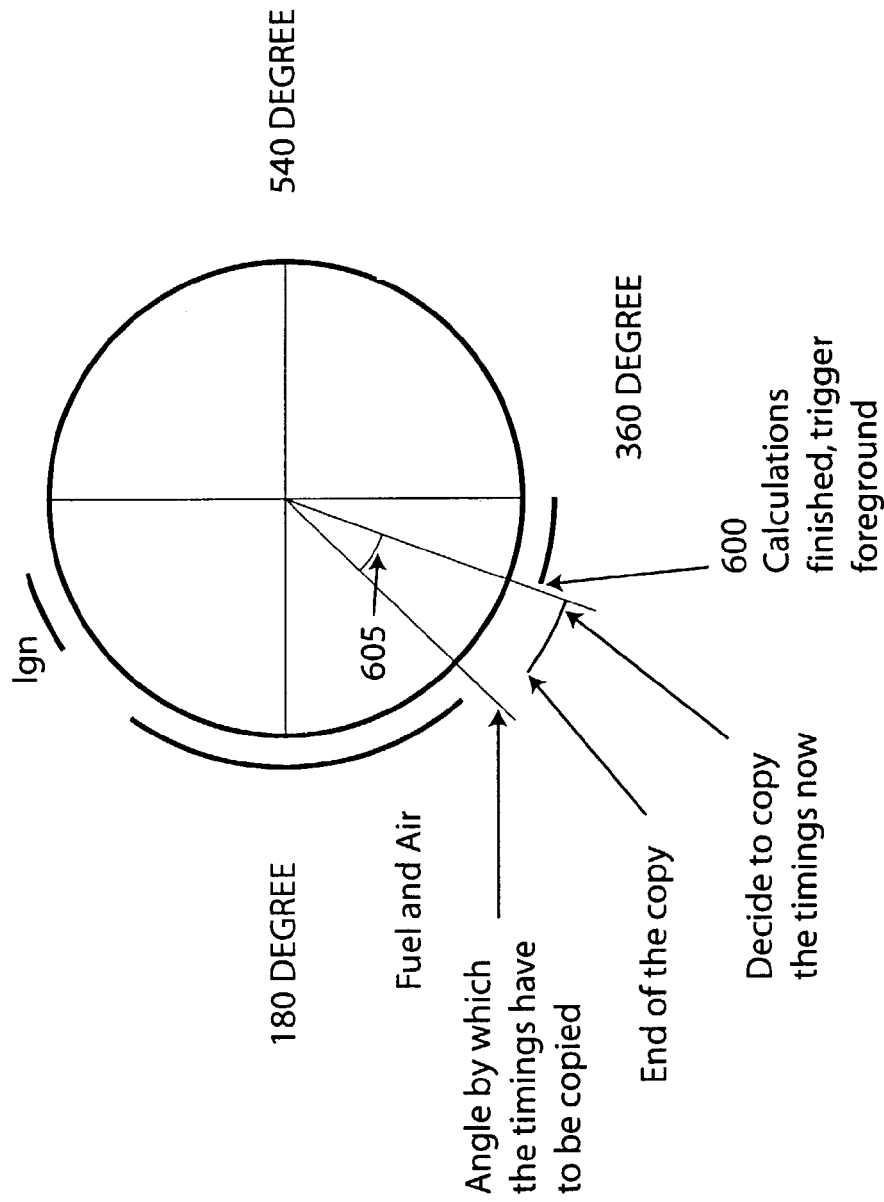
FIG. 6 is a crankangle diagram showing one mode of scheduling an update of timing events.

Referring now to FIG. 6 which demonstrates triggering an update when a new timing sequence is received. In order to have the update as close as possible to receipt of the new timings 600 it is preferable to trigger an update by the sequence scheduler as soon as new timings are received in the desired timings buffer. This should preferably happen within 60 deg CA of receipt of the new timings 600.

An update of the scheduler 3 can last up to one 60 deg CA segment but does preferably not exceed one segment. At receipt of the new timings 600 in the desired timings buffer 20 the sequence scheduler rules 35 check whether or not the update can happen. If the prevailing event chain has started or if the update timings should have started then update can not take place. To effect this, the scheduler 3 gets the current CA position of the engine and checks that there is a full segment 605 between the prevailing event and the current position and between the update event and the current position. If there is a full segment the scheduler rules 35 flags the fact that the timings can be updated into the prevailing buffer 30. At the start of the next segment a process in foreground will update the timings directly into the prevailing buffer 30 and also into the update timings buffer 25 and de-flag them from the desired timings buffer before the end of the segment. If an event cannot be updated in the segment following receipt of the new timings, they will be copied into the update timings buffer and updated later into the prevailing buffer, typically during a guaranteed update period at the end of an event in the prevailing event chain.

All timing sequences are preferably calculated as background process. Once a calculation is finished the updating procedure is triggered to happen as a foreground process. The foreground process decides first how to update the timings if they are ready to be updated and may updated them afterwards in a single update procedure or update parts of them in a staged manner. In present embodiments the staged update is a two stage process occurring at EOA and at EOI. However it could be a three stage process with updates for SOF and EOF written to the prevailing buffer at EOF of the prevailing event chain. Similarly update SOA and EOA may be written to the prevailing timing buffer at EOA of the prevailing event chain and update SOI and EOI may be written to the prevailing timing buffer 30 at EOI of the prevailing event chain. As detailed previously such a staged update may be referred to as a guaranteed update period in a system having a rule that no event such as the period of fuel metering and the period of fuel delivery can exceed 720° of crank angle. In present embodiments, the guaranteed update period commences at EOA in an event chain of SOF, EOF, SOA, EOA, SOI, EOI. During the guaranteed update period it is not possible to write from the desired timings buffer 20 to the update timings buffer 25. The update timing buffer 25 is written to the prevailing timings buffer 30 during the guaranteed update period in the manner detailed above. This rule assists with ensuring that event chain integrity is maintained. It is preferable to make sure that a previous update is not presently in progress before commencing an new update process.

Before commencing an update of the prevailing timing buffer 30 it is also preferable to check that there won't be any overlap of the update fuel event with the prevailing air event. This may occur when changing from retarded light load timings to advanced high load timings where fuel metering commences in the engine cycle previous to the cycle in which it combusted. If there is such an overlap the fuel event is preferably retarded (i.e. clipped). Because the end of air interrupt can for example last up to 10 deg CA, the gap between the end of the fuel event and the start of the air event is preferably greater than 10 deg CA.

Referring now to FIG. 7 which shows the case where there is insufficient time for a foreground process to update the prevailing timings buffer 30 before the update event would commence. I.e. SOF 705 of the update event 700 is within 60 crank angle degrees of the point 710 where the desired timings buffer receives new timing sequence. The update of fuel metering and fuel delivery timings can occur at an end of air interrupt at point FA (which is after the prevailing fuel and air event has finished), and ignition timings can be updated into the scheduler 3 as marked at point I, after the prevailing ignition event has finished. Alternatively, the fuel metering, fuel delivery and ignition timings can all be updated at TDC or 540 deg CA after the prevailing timing sequence has finished and before the update timing sequence is scheduled to commence.

Figure 8:
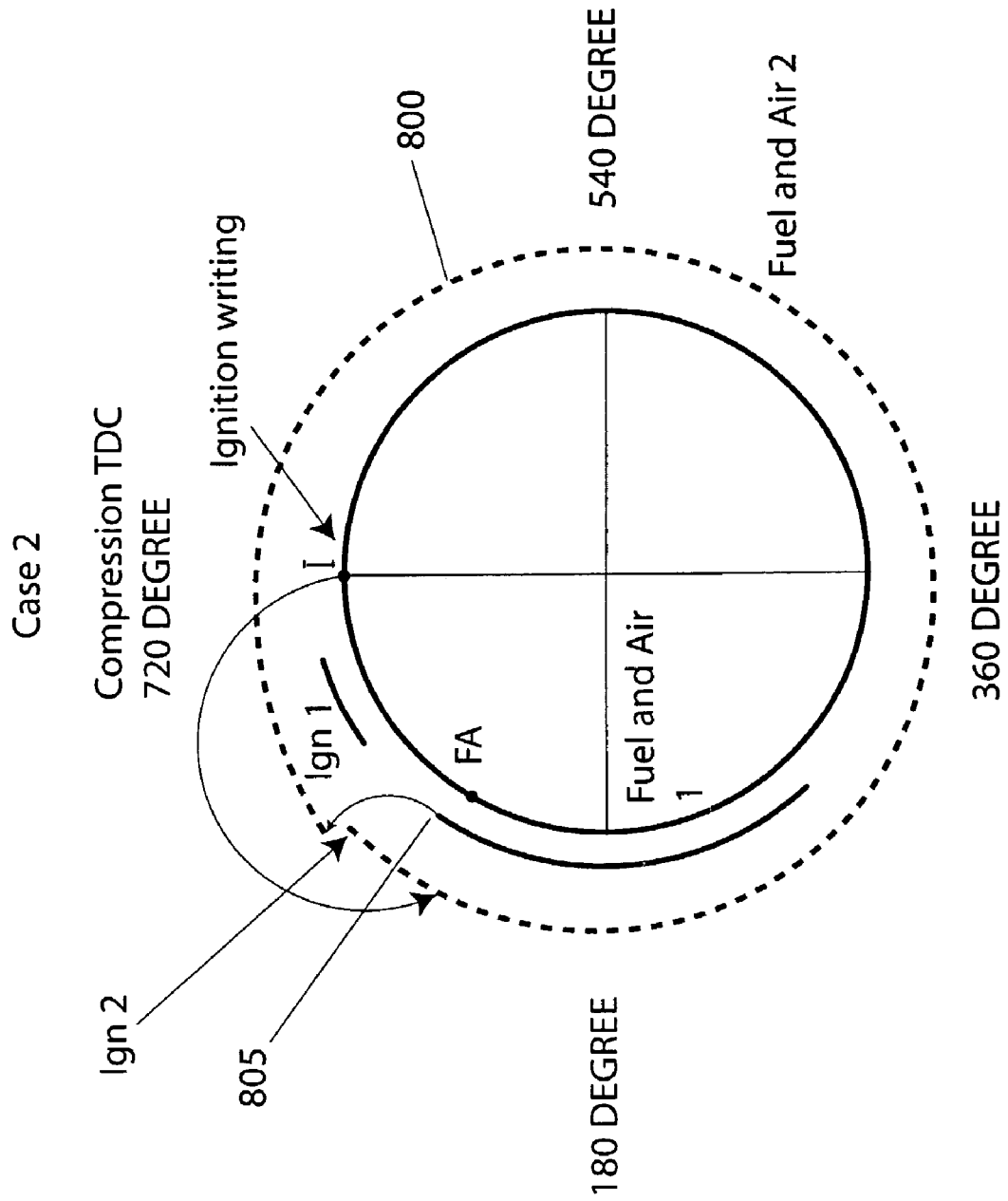
FIG. 8 is a crankangle diagram showing an update from retarded timings to advanced timings.

Referring now to FIG. 8 which depicts the case where the engine is operating at high speed and it is not possible to update the prevailing timing buffer 30 after TDC as the update timing sequence 800 is scheduled to commence before TDC. Also it is not possible to update the entire timing sequence at the end of the air event 805 without causing two ignition events in the current cylinder cycle (the first of which "Ign2" would be too advanced for prevailing conditions and so may cause a misfire). In this case, the fuel and air injection timing will be updated by use of an end of air interrupt at point FA and the ignition timing updated at TDC, as marked as point I.

Figure 9:
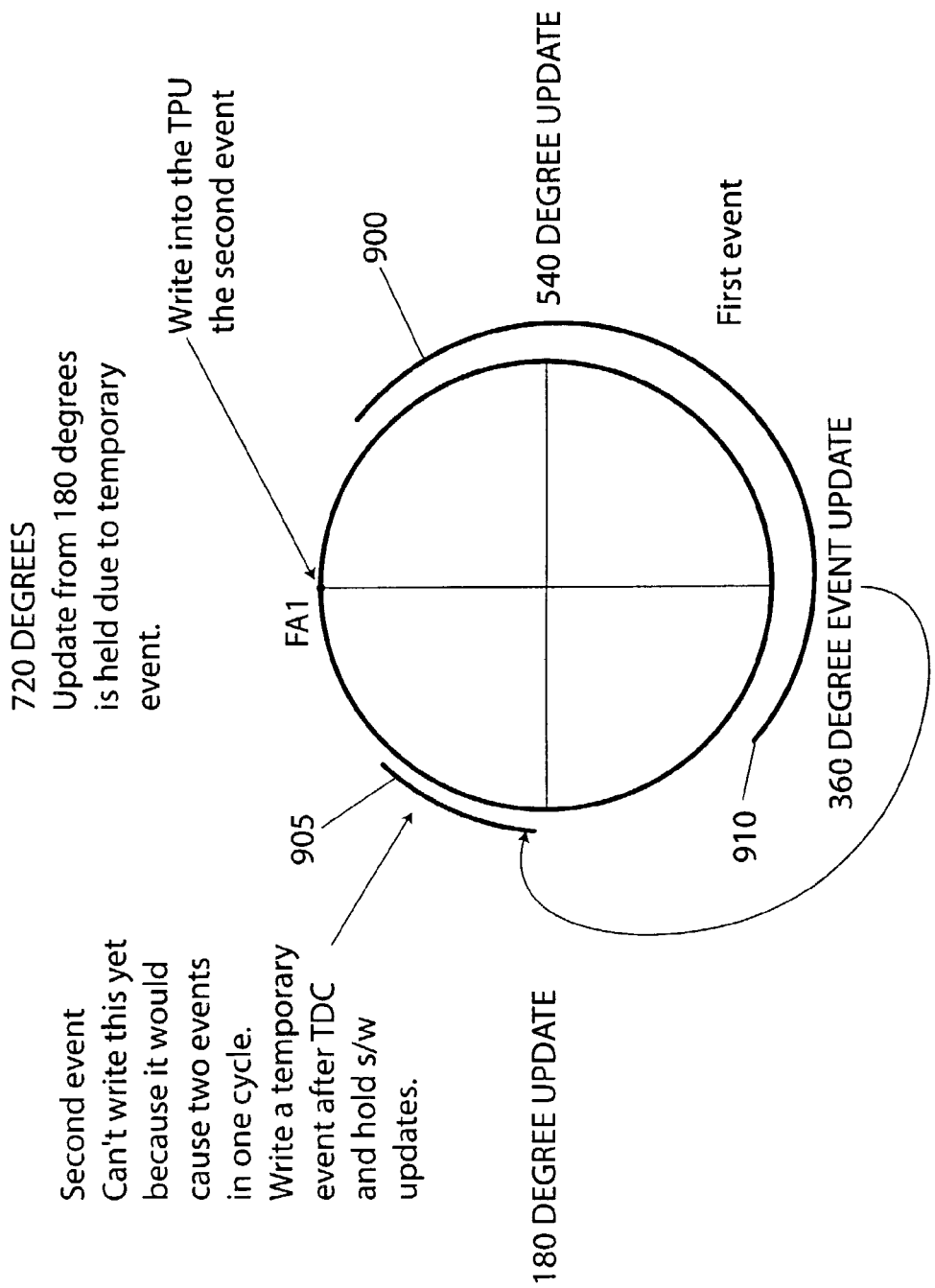
FIG. 9 is crankangle diagram showing an update from advanced timings to retarded timings so as to avoid a double pulse occurring in one engine cycle.

FIG. 9 depicts the case where timings change from advanced 900 to retarded 905 and it is not possible to update the prevailing timing buffer as a foreground process after EOA 910 and before TDC without both the advanced 900 and the retarded 905 events happening in the same engine cycle. However, neither the prevailing event 900 nor the update event 905 are so advanced that the update event can not be programmed at the next TDC. The fuel, air and ignition events are hence updated at TDC at the end of the prevailing timing sequence. Alternatively a dummy event, of the type detailed in further in FIG. 11, may be written to the prevailing timings buffer at EOA 910.

Figure 10:
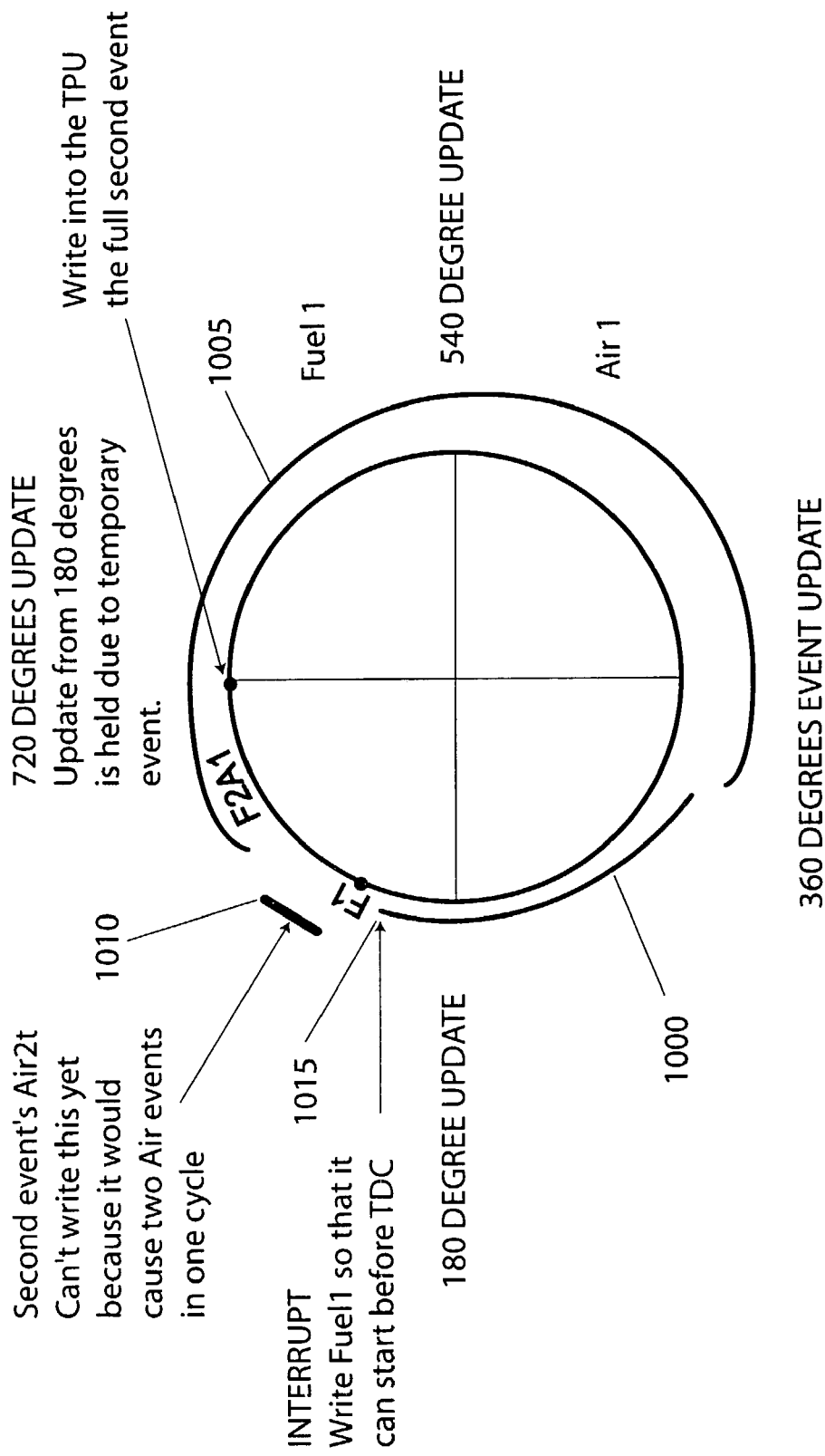
FIG. 10 is crankangle diagram showing an update from a single injection mode to a dual injection mode.

FIG. 10 depicts the case where the engine was operating with retarded timings 1000 with a single actuation of the delivery injector 110 (referred to as single injection mode) and is subsequently required to operate with advanced timings 1005 & 1010 with the delivery injector being actuated twice in the one cycle (referred to as dual injection mode and being an example of an event where a double pulse is permitted). It is too late to update as a foreground process before TDC on the prevailing cycle before dual injection is required and the scheduler 3 can not be programmed at the end of the air event 1015 without causing a second air event 1010 occurring in the prevailing single injection cylinder cycle. Further the new dual injection event 1005 starts very early and can not be fully programmed at TDC. The first fuel event 1005 will hence be programmed by use of an end of air interrupt at point F1 and the rest of the dual injection event 1010 and ignition (not shown) will be programmed at TDC, marked as point F2A1.

FIG. 11 depicts the reverse scenario to FIG. 10, being a transition from dual injection mode 1100 & 1105 to single injection mode 1110. It is too late to update the prevailing timing buffer as a foreground process at TDC as the dual injection mode will have commenced. The prevailing timing buffer also can not be programmed at the end of the second of the prevailing air events 1115 without causing the update events to occur in the same cylinder cycle as the prevailing event (i.e. a double pulse). However as the old event starts very early it therefore needs to be stopped via an end of air interrupt which allows the scheduler 3 to be fully updated at the next TDC. To avoid having the old timings cause an event before TDC, a temporary event 1120 (sometimes referred to as a dummy event) has to be updated into the prevailing timing buffer 30 at an end of air injection interrupt 1115. The temporary event advances fuel metering and delivery for the update event so that an additional event does not occur during the prevailing event. At TDC the update timing sequence of the new prevailing event that were previously advanced via writing of dummy event 1120 are now retarded to their original timing angles 1110. This represents a variation on the two stage update process referred to previously where timings change from retarded and light load to advanced and high load.

Accordingly with these strategies for updating the prevailing event buffer from both the desired timings buffer and the update buffer ensure that event chain integrity is maintained during these updates so that misfire events are minimised.

The scheduling of the timing sequences of the injection and ignition events according to the present embodiment eliminates or at least substantially minimises the occurrence of unwanted double or missing injection events. The result is improved combustion and engine operation, particularly where a four stroke engine uses a dual fluid injection system. It is however to be appreciated that the present embodiment is also applicable for single fluid injection systems, both whether direct injected or manifold injected.

The method and apparatus according to the present invention is applicable to the both two and four stroke engines, whether direct injected or manifold/part injected. Further, whilst the invention has in the main been described with regard to the scheduling of the fuel injection and ignition events required in the electronic fuel injection system, it may equally have application to the scheduling of the other events which may effect engine operation. For example, the invention may be used to control the scheduling of the opening and closing of an air valve located in the air intake system such as that discussed in the Applicants' co-pending Australian Provisional Patent Application No. PQ7295, the contents of which are included herein by way of reference.

Modifications and variations as would be deemed obvious to the person skilled in the art are included within the ambit of the present invention.

What is claimed is:

1. An electronic control system for an internal combustion engine, said electronic control system comprising:
    sequence scheduler means for storing timing sequence data as either prevailing timing sequence data for use in generating driver control signals or update timing sequence data for use in updating said prevailing timing sequence data, and for outputting driver control signals to at least one driver circuit; and
    a timing determination means for determining timing sequence data for use in controlling operation of engine components and for outputting timing sequence data to said sequence scheduler means;
    wherein said at least one driver circuit outputs control signals to said engine components whereby said engine components are controlled by said electronic control system; and
    wherein said sequence scheduler means schedules an update of said prevailing timing sequence data with said update timing sequence data having regard to the relative timings of said prevailing timing sequence data and said update timing sequence data.

2. An electronic control system as claimed in claim 1 wherein said update timings data further comprises an update angle corresponding to a crank angle of said engine at which said update is scheduled to occur, said update angle dependent on said relative timings of said prevailing timings data and said update timings data.

3. An electronic control system as claimed in claim 1 wherein said driver control signals of said sequence scheduler means are adapted to control said driver circuit in real time relative to an engine cycle of said engine.

4. An electronic control system as claimed in claim 3 wherein said sequence scheduler means operates as a foreground process and said timings determination means operates as a background process.

5. An electronic control system as claimed in claim 1 wherein said timing sequence data comprises an event chain for operating at least two engine components in a timed relation.

6. An electronic control system as claimed in claim 5 wherein an update of prevailing timing sequence data maintains event chain integrity of said prevailing timing sequence data.

7. An electronic control system as claimed in claim 6 wherein said event chain integrity is maintained for at least some engine operating conditions.

8. An electronic control system as claimed in claim 5 wherein said event chain controls operation of said engine components for a period greater than one engine cycle.

9. An electronic control system as claimed in claim 5 wherein said event chain is updated in at least two stages.

10. An electronic control system as claimed in claim 5 wherein said event chain comprises at least a first and a second section, said first section for controlling operation of at least one engine component and said second section for controlling operation of at least a second engine component and wherein a first section of prevailing timings data is updated separately to a second section of prevailing timings data.

11. An electronic control system as claimed in claim 10 wherein said first section of said prevailing timings data is updated upon completion of said first section and prior to commencement of said second section whereby timing sequence data can control operation of multiple engine components for a duration exceeding one engine cycle.

12. An electronic control system according to claim 1 further adapted to provide multiple update timings per engine cycle.

13. An electronic control system according to claim 1 further adapted to provide update timings asynchronous to prevailing timings whereby update of prevailing timings with update timings is dependent on relative timings of said update timings and said prevailing timings.

14. An electronic control system as claimed in claim 6 wherein updated of prevailing sequence data is prevented if such update would result in unwanted missing or double events.

15. An electronic control system as claimed in claim 1 wherein updated of prevailing sequence data is prevented if such update would result in unwanted missing or double events.

16. An electronic control unit for operating an internal combustion engine and adapted to schedule at least fuel injection and ignition events which said fuel injection and ignition events comprise an event chain wherein said event chain has a duration exceeding one engine cycle, wherein said event chains are undated from cycle to cycle and wherein event chain integrity is maintained by said updates.

17. An electronic control unit as claimed in claim 16 wherein a prevailing event chain is updated with an update event chain and wherein a first section of said prevailing event chain is updated with a first section of said update chain prior to execution of said second section of said prevailing event chain.

18. An electronic control unit as claimed in claim 16 wherein said electronic control unit comprises at least a prevailing event memory for storing prevailing event chains and an update event memory for storing an update event chain and wherein a first section of said update event chain is written to a first section of said prevailing event memory and wherein a second section of said update event chain is written to a second section of said prevailing event memory.

19. An electronic control unit as claimed in claim 16 wherein an update of a prevailing event chain is dependent on timing sequences for said prevailing event chain and an update event chain.

20. An electronic control unit as claimed in claim 19 wherein update of said prevailing event chain is scheduled dependent on whether events of said update chain are retarded or advanced relative to said prevailing event chain.

21. An electronic control unit for an internal combustion engine having a fuel injection system and an ignition system controlled by said electronic control unit, said electronic control unit including a scheduler for outputting timing sequence control signals for controlling said fuel injection system and said ignition system; wherein said scheduler is adapted to update at least one prevailing timing sequence control signal in dependence on at least one operational parameter of said engine, the scheduler selecting between a prevailing timing sequence signal or an update timing sequence signal to control the driver circuit depending on said at least one operational parameter of the engine.

22. An electronic control unit according to claim 21, wherein said at least one operational parameter of said engine being at least one of crank angle of a crankshaft of said engine; engine load; engine speed.

23. An electronic control unit according to claim 22, wherein the update signal for use in updating said prevailing timing sequence control signal includes an update angle; said scheduler updating said prevailing timing sequence control signal in dependence on said crank angle and said update angle.

24. An electronic control unit according to claim 23, wherein said scheduler is adapted to compare said update angle with said crank angle and to update said prevailing timing sequence control signal when said update angle equals said crank angle and when said fuel injection system and ignition system is not activated by said prevailing timing sequence control signal.

25. An electronic control unit according to claim 24, wherein said comparison of said update signal occurs upon generation of said signal or upon said scheduler receiving said update signal.

26. An electronic control unit according to claim 21, wherein said electronic control unit further includes a timing determination means for determining the timing sequence of an injection event of a fuel injection system and an ignition event of an ignition system; and a driver circuit which receives inputs from the scheduler for providing drive pulses to the fuel injection system and ignition system.

27. An electronic control unit according to claim 21 wherein the scheduler includes a first buffer for storing the prevailing timing sequence, and a second buffer for receiving and storing the update timing sequence from the timing determination means.

28. An electronic control unit according to claim 27, wherein the update timing sequence is intermittently copied to the first buffer which controls the driver circuit.

29. An electronic control unit according to claims 21 wherein the engine includes a dual fluid fuel injection system.

30. An electronic control unit as claimed in claim 21 wherein updated of prevailing sequence data is prevented if such update would result in unwanted missing or double events.

31. An electronic control unit for operating an internal combustion engine and adapted to schedule at least fuel injection and ignition events which said fuel injection and ignition events comprise an event chain wherein said event chain has a duration exceeding one engine cycle wherein updating of prevailing sequence data is prevented if such update would result in unwanted missing or double events.

* * * * *